Jan. 10, 1956    M. B. SAMPSON    2,729,879
CUT-OFF MACHINE

Filed Aug. 17, 1949    5 Sheets-Sheet 4

INVENTOR.
MERRITT B. SAMPSON
BY
Oberlin & Limbach
ATTORNEYS.

Jan. 10, 1956  M. B. SAMPSON  2,729,879
CUT-OFF MACHINE
Filed Aug. 17, 1949  5 Sheets-Sheet 5
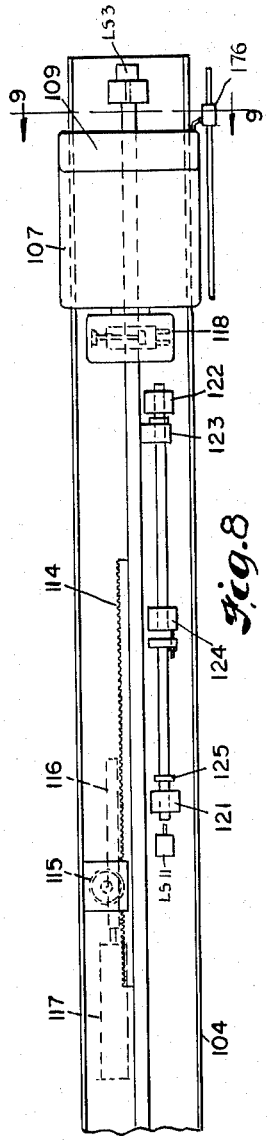
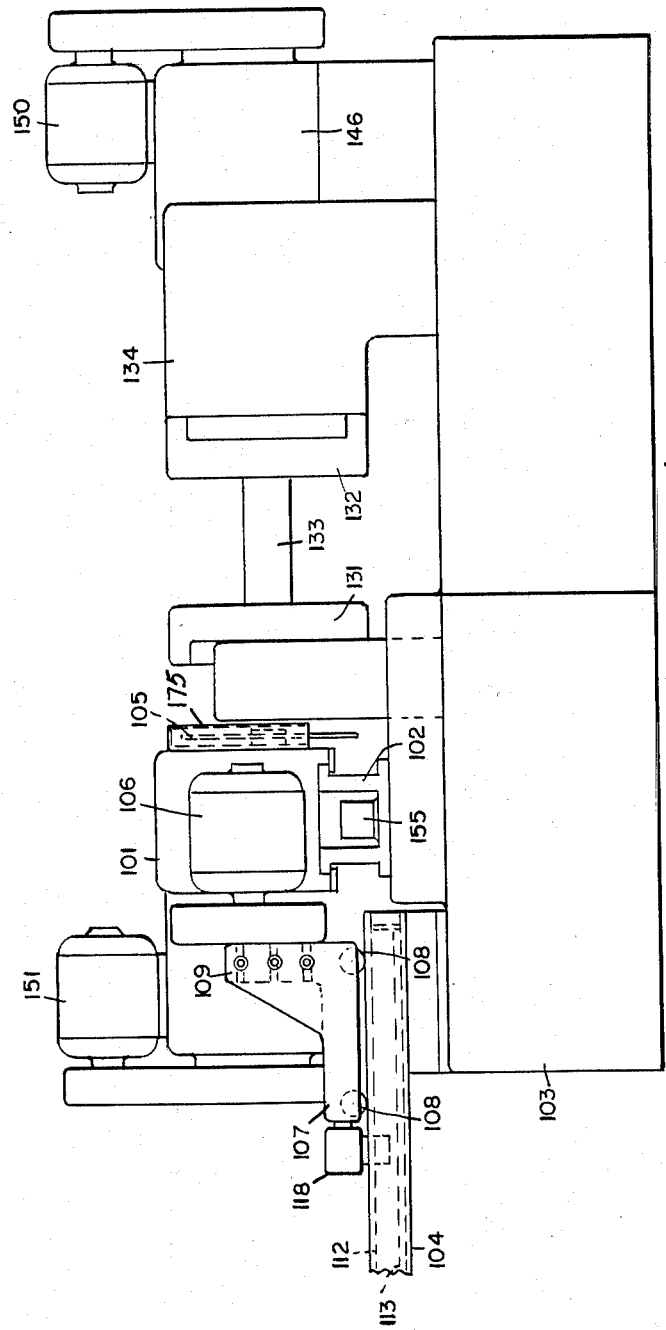
INVENTOR.
MERRITT B. SAMPSON.
BY
Oberlin & Limbach
ATTORNEYS.

United States Patent Office 2,729,879
Patented Jan. 10, 1956

2,729,879
CUT-OFF MACHINE

Merritt B. Sampson, Chagrin Falls, Ohio, assignor to The Motch & Merryweather Machinery Company, Cleveland, Ohio, a corporation of Ohio Application August 17, 1949, Serial No. 110,838

5 Claims. (Cl. 29—69)

This invention relates as indicated to a cut-off and multiple operation machine and more particularly to a machine in which a continuous length of stock is adapted to be intermittently advanced into position to be cut off by a rotary saw and further operations then performed on such cut-off sections prior to discharge from the machine.

Automatic metal sawing machines are now commonly employed for the purpose of cutting long lengths of bar stock, tubing and the like into relatively short sections which are then carried to other machines to have additional operations performed thereon. A very considerable increase in efficiency might obviously be obtained by providing means in conjunction with such sawing machine for automatically transferring the severed work-piece to later work stations where such additional operations such as chamfering, counterboring and the like may be performed. Various problems arise, however, when it is attempted thus to combine an automatic sawing machine with suitable transfer mechanism and other machine tools. It is generally necessary when inserting a new length of stock into the machine to provide for a cropping cut to remove a short length from the end of the stock which has usually been marred in previous handling. The intermittent feeding of the stock must be very precise in order that a high degree of uniformity in the cut-off work-pieces may be obtained and means must be provided for rigidly clamping the stock during the sawing operation without, however, interfering with subsequent transfer of the cut-off section to the later work stations. It is also important, once the stock has been clamped in the sawing machine, that proper registry and gauging of the same be thereafter maintained in order that further handling of the same in the machine may be accurate and automatic.

It has been common practice in the past to clamp a number of lengths of stock together in order that the same may be severed by a single traverse of the saw head, but the sections cut off in this manner are obviously not amenable to the performance of further automatic operations thereon in the same machine.

It is accordingly a primary object of my invention to provide a cut-off and multiple operation machine which is adapted automatically to feed a length of stock such as bar stock or tubing to a rotary saw for the severing of sections therefrom and then to transfer such cut-off sections in proper registry to a subsequent work station or stations for the performance of additional operations thereon.

Another object of my invention is to provide such machine in which a plurality of lengths of stock may be handled simultaneously while maintaining proper registry of the work-pieces at all times.

Still another object is to provide means for automatically cropping the end of a new length of stock when the same is initially inserted in the machine.

A further object is to provide mechanism whereby operation of the machine will automatically stop when an insufficient length of stock remains to provide an additional work-piece of desired dimensions.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 5 is a front elevational view of the machine of Fig. 3;

Fig. 8 is a top plan view of one form of automatic stock feed mechanism adapted to be employed in conjunction with and forming a part of the machine illustrated in Fig. 3.

General construction

Figure 1:
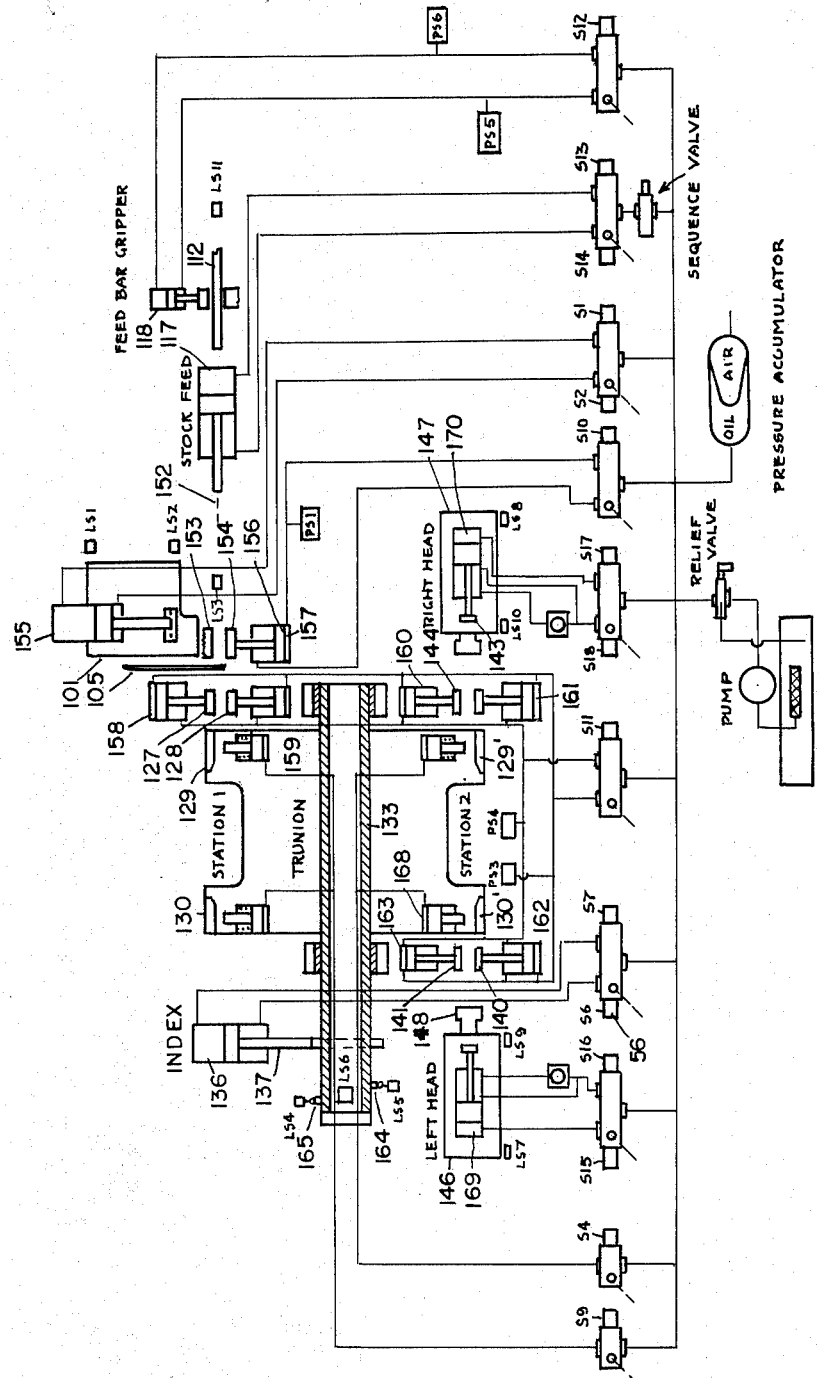
Fig. 1 is a diagrammatic layout of one embodiment of my invention showing a preferred fluid pressure system for operating the same.

Referring now more particularly to said drawing and especially Figs. 3–9 thereof, the general construction of the embodiment of my invention therein illustrated will first be described. A saw carriage 101 is mounted on ways 102 carried by box frame 103 for reciprocation transversely of stock feed guideway 104. The rotary metal cutting saw 105 traveling with such carriage is driven by an electric motor 106 preferably in the direction indicated by the arrow in Fig. 4 so that such saw will cut upwardly into the work.

The stock feed mechanism will preferably be of the general type described in Patent No. 2,641,046 of Edwin R. Motch, Jr., issued June 9, 1953, including a carriage or dolly 107 mounted on wheels or rollers 108 adapted to travel along the channel track or guideway 104. At the forward end of such dolly is an upstanding clamping head 109 having a plurality of inserted clamping jaws 110 (in this case three) arranged above one another on an arc corresponding to the peripheral arc of saw blade 105. Screws 111 are provided to clamp such jaws tightly on lengths of stock respectively threaded therethrough.

An elongated auxiliary feed bar 112 extends longitudinally of channel-form trackway 104 resting on wear plate 113 in the bed of such channel. As more fully explained in such application Serial No. 62,135 of Edwin R. Motch, Jr., a rack 114 may be secured to one side of such bar in driven engagement with a pinion 115 adapted to be rotated by a rack 116 reciprocated by the piston of fluid pressure piston-cylinder assembly 117. Accordingly, such auxiliary feed bar 112 may be reciprocated within the limits of such piston-cylinder assembly.

Dolly 107 carries at its rear a transversely disposed piston-cylinder assembly 118 operative to clamp and unclamp jaws 119 effective to attach such dolly to such auxiliary feed bar 112. As explained below, such dolly will be thus secured to such feed bar when the latter is advanced toward the saw but will be disengaged therefrom when such bar is returned to starting position. In this manner the dolly and the lengths of stock clamped thereto may be intermittently advanced toward the saw.

Gauge means are provided including a measuring bar 120 mounted in brackets 121 and 122 on the web of channel-form trackway 104. A sleeve 123 embracing measuring bar 120 is secured to auxiliary feed bar 112 for reciprocation with the latter, engagement of such sleeve with bracket 122 limiting forward movement of such feed bar. An adjustable stop 124 is secured in selected position on measuring bar 120 to be engaged by sleeve 123 when the auxiliary feed bar is reciprocated in the opposite direction. Upon being thus engaged, feed bar 112 will be reciprocated to the left in its mounts 121, 123, to the extent permitted by collar 125 which thereupon engages mounting bracket 121. Such degree of reciprocation of measuring bar 120 is sufficient to cause the end of such bar to engage and operate limit switch LS11 and actuate the latter for a purpose explained below.

By operation of the above-described feed mechanism a length of work-piece may be fed through column clamp 126 past saw blade 105, between clamping jaws 127 and 128 to the other side of such saw blade and through collets 129 and 130 of transfer drum elements 131 and 132 respectively. Such elements are carried by a central trunnion 133 for rotation in unison therewith, such trunnion being journalled in end stands 134 and 135. A corresponding pair of collets 129′ and 130′ are located in such elements in diametrically opposite positions. A fluid pressure piston cylinder assembly 136 is operative to rock trunnion 133 through rack 137 engaging a gear segment (not shown) on such trunnion to bring such respective pairs of collets alternately into alignment with column clamp 126 and clamping jaws 127 and 128. For purposes of convenience, the operation of the machine will be described with but a single length of stock being handled at one time, but it is to be understood that the column clamp, clamping jaws 127, 128, and the other clamping means such as the aforesaid collets may be provided with a plurality of jaw members to receive a plurality of lengths of stock simultaneously as in the case of jaws 119 on dolly 107. A limit switch LS6 is mounted in stand 135 for operation by cam 138 on trunnion 133 as the latter turns. A machine clamp 139 having clamping jaws 140 and 141 and a machine clamp 142 having clamping jaws 143 and 144 are respectively mounted with such jaws in alignment with collets 130′ and 129′ at the second work station. Mounted on ways 145 for adjustment toward and away from such respective clamps are machine tool power units 146 and 147 having spindles 148 and 149 respectively driven by electric motors 150 and 151.

*Operation*

Figure 2:
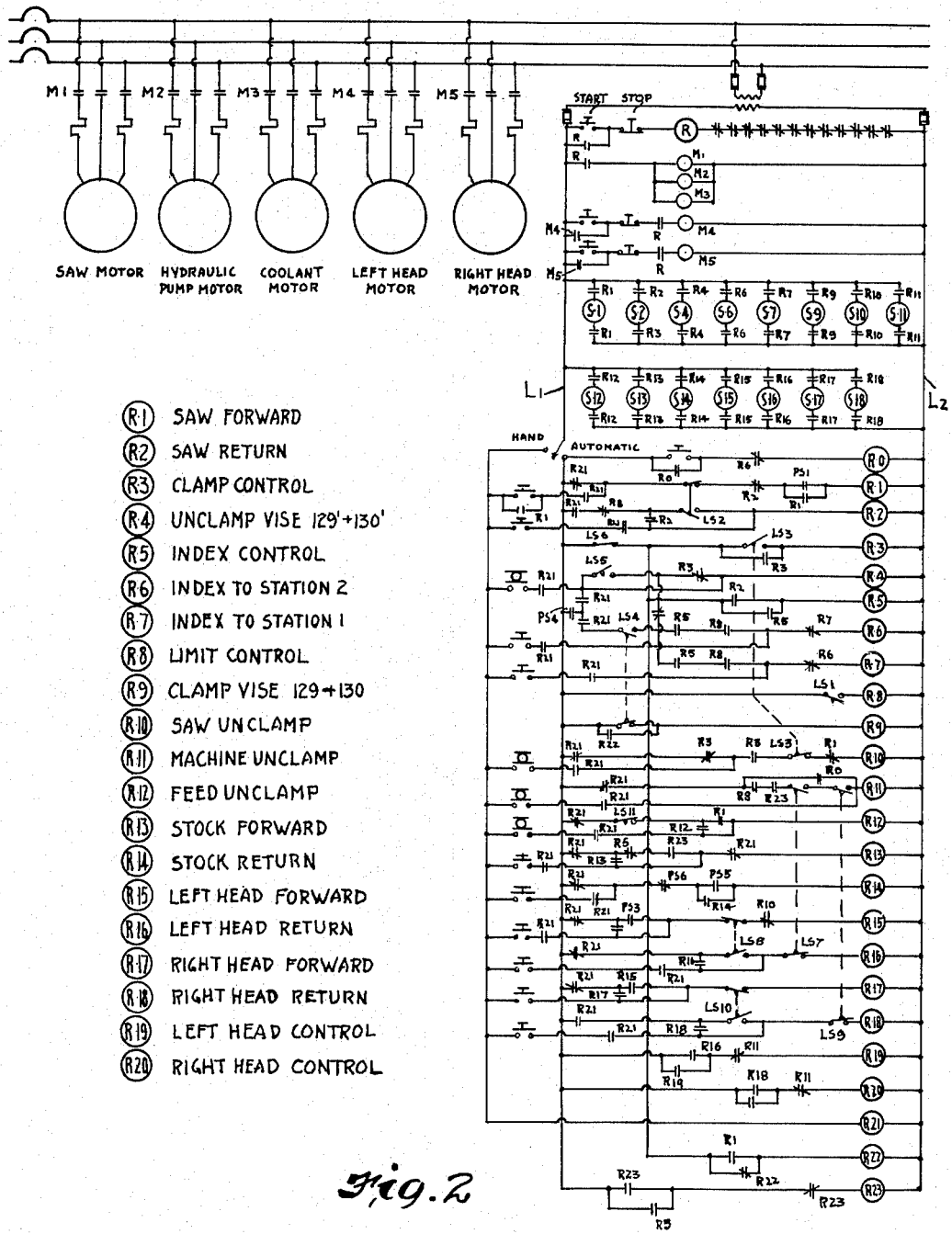
Fig. 2 is a wiring diagram illustrating electrical control means for controlling such fluid pressure system.
Figure 3:
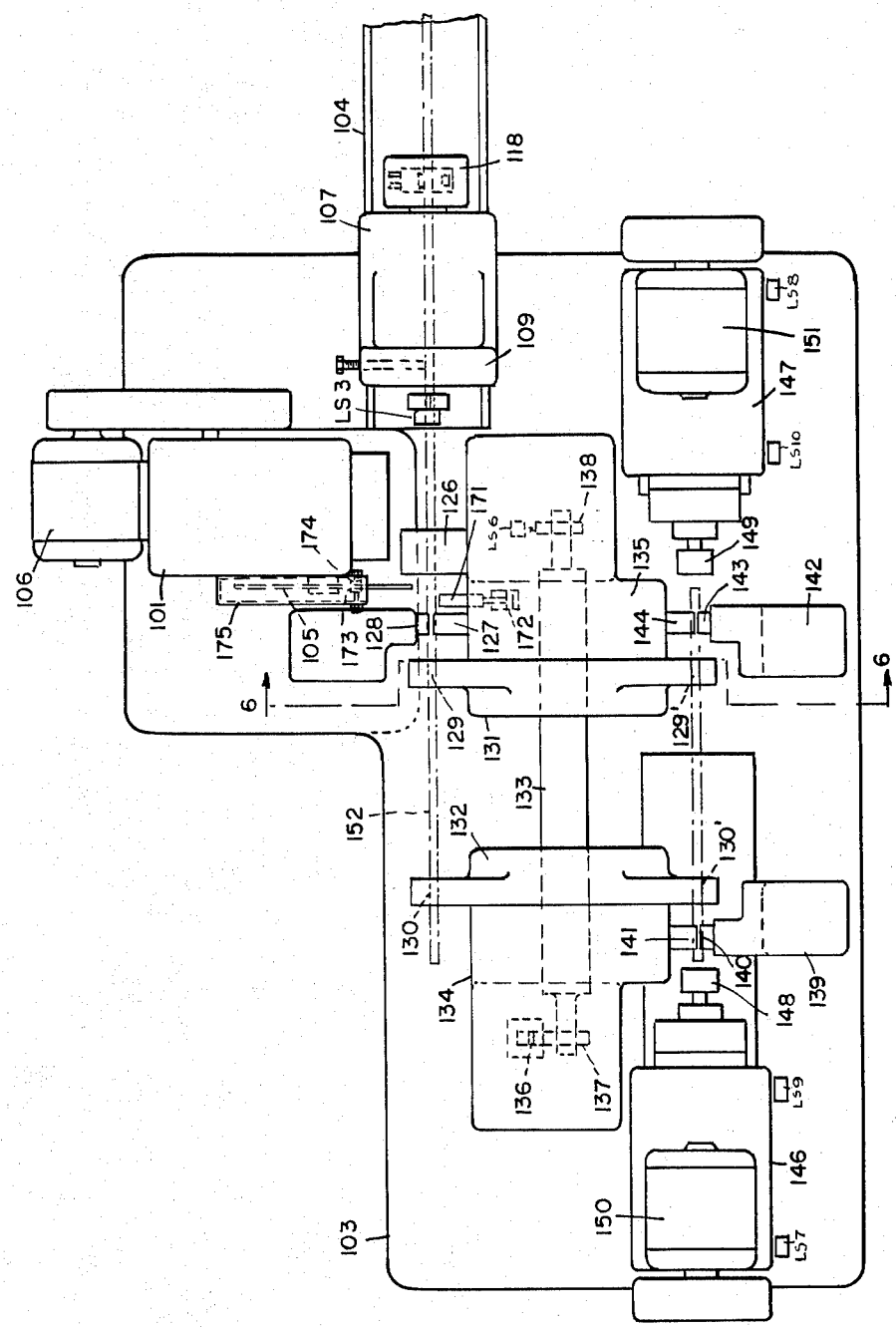
Fig. 3 is a top plan view of a combined cut-off and multiple operation machine embodying the various features of my invention.

Further details of construction of my new machine may best be understood in conjunction with a description of the operation of the same. Referring now more particularly to Figs. 1 and 2 of the drawing, the operator will set up the machine by securing the following end portion of one or more lengths of stock 152 in jaws 110 on dolly 107 and threading the forward end of such stock through between the jaws 153 and 154 of the saw vise 126. The jaws 127 and 128 of the machine clamp at the first work station will be closed at this time and the end of the stock will abut thereagainst. It will thus be seen that the end of the stock has been advanced but a slight distance beyond saw blade 105 and such stock has not been fed to the collets of the transfer drum.

The operator now manually selects the saw vise clamp at the control station by turning the selector switch to grip the stock between column clamp jaws 153 and 154.

After ascertaining that all the machining heads including the saw head are in their rear positions, the operator next selects "automatic" control at the hand-automatic switch and the saw carriage 101 will now advance saw 105 to cut off the stock. Simultaneously with the advance of such saw carriage machine clamp jaws 127 and 128 will unclamp and therefore no longer obstruct the end of the stock.

Such action is obtained when switching the hand-automatic control switch from "hand" to "automatic" since solenoid operated four-way valve S10 in its normal position will admit fluid pressure to cylinder 157 to move piston 156 to urge jaw 154 into work clamping position. The saw carriage 101 then goes forward when pressure building up in the line to cylinder 157 operates pressure switch PS1 in series with relay R1 and the only remaining switch required to complete the circuit between lines L1 and L2. By thus making a circuit through relay R1 solenoid S1 is caused to actuate four-way valve S1, S2, admitting fluid pressure to the piston end of saw feed cylinder 155, advancing the saw to make a cut.

Machine clamp jaws 127, 128, and 140, 141, and 143, 145, are all in closed position to begin with but open when the hand-automatic switch is turned to "automatic" and start cycle switch is depressed since normally open relay contact R23 is thereby interposed between relay R11 and line L1. Relay R11, the circuit of which has now been made, causes the solenoid S11 operated four-way valve to admit fluid pressure to the piston rod ends of cylinders 158, 159, 160, 161, 162, and 163, retracting such clamping jaws.

The saw carriage 101 continues to advance, severing a short end from the stock which drops down out of the way, until its forward trip dog strikes limit switch LS2, the normally closed contacts of which will open the circuit through relay R1, causing solenoid S1 to drop out, and the normally open contacts of switch LS2 will be closed causing relay R2 to energize solenoid S2 and thereby achieve complete reversal of four-way valve S1, S2, directing fluid pressure to the rod end of cylinder 155. The saw carriage is accordingly returned and the machine is ready to begin upon a fully automatic cycle of operation.

At the time that relay R2 is made, index control relay R5 is also made, held through its own normally open holding contact. The saw carriage continues to return until its rear dog strikes limit switch LS1, causing limit control relay R8 to be energized which drops out relay R2, causing solenoid S2 to drop out. This returns valve S1, S2, to its central position locking the oil in the lines to cylinder 155 against flow to tank. The saw vise or column clamp jaw 154 will now unclamp since the normally open relay contact R8 is the only switch interposed between lines L1 and L2 at this time required to complete the circuit which will cause relay R10 to be actuated. Relay R10 energizes solenoid S10 to switch the fluid pressure flow to the rod end of saw vise cylinder 157, thus retracting jaw 154.

The action of relay R8 also serves to cause indexing of trunnion 133, swinging collets or clamps 129, 130, from station 1 to station 2 and bringing clamps 129′, 130′, from station 2 to station 1, by virtue of the series combination of the normally open contactors in relays R5 and R8 interposed between lines L1 and L2. Relay R6 will cause solenoid S6 to shift four-way valve S6, S7, to connect the rod end of cylinder 136 to pressure and the piston end to tank, thereby rotating trunnion 133 180° through rack 137.

When clamps 129′, 130′, are swung to station 1, they unclamp as a result of actuation of limit switch LS5 by cam 164 on trunnion 133. Relay R4 is operated by cam 165 on such trunnion to shift solenoid S4 and connect the piston end of clamp cylinders 167 and 168 of clamps 129′ and 130′ to tank. Since clamps or collets 129′ and 130′ are now aligned with the stock feeder at station 1, and are open, we are now ready to feed stock through between jaws 127, 128, of the machine clamp at station 1 and into such clamps 129', 130'. At this stage such latter clamps are empty but after two more cycles of operation they will contain a finished work-piece which will be ejected by further feeding of the stock. A rack (not shown) may desirably be provided to receive and support such work-pieces as they are thus ejected.

Since index control relay R5 has been energized once, so far, relay R23 is picked up and held by virtue of its own holding contact throughout the indexing cycle. Relay R22 has been energized as a result of one cycle by the saw carriage and one indexing of trunnion 133, thereby making the start forward through relay R13 and energizing solenoid S13, connecting the rod end of stock feed cylinder 117 to tank and the piston end to pressure, advancing the stock. When the auxiliary feed bar 112 engages and operates limit switch LS3 a predetermined length of stock will have been fed into the machine and clamp control relay R3 will be energized. The normally closed pair of contacts in series with the relay R4 will then break the circuit through relay R4 causing fluid pressure to be admitted to the piston end of cylinders 167 and 168 (now at station 1), thereby clamping the stock.

The circuit through relay R10 was previously made by the combination of relay R8, normally closed limit switch LS3, and normally closed relay R1. Upon making the clamp 129', 130' control relay R3 as above described, the normally closed contact R3 in series with the relay R10 will open, breaking the circuit through relay R10 and thus breaking the circuit through solenoid S10, causing fluid pressure to be admitted to the piston end of the saw vise cylinder 157 with the rod end connected to tank. Vise jaw 154 is thereby advanced to grip the stock 152.

Machine clamps 127, 128 and 140, 141, and 143, 144 have been held unclamped by virtue of an electric circuit made through the normally open contactors of limit switches LS9 and LS7, and normally open relay R8, all of which are closed at this time. Operation of normally closed relay R3 as noted above which is in series with relay R23 will break the circuit through the latter, causing the latter, in series with relay R11, to return to normal position opening the circuit through relay R11. This results in deenergization of solenoid S11 so that fluid pressure is now admitted to the piston ends of all the machine clamp cylinders 158, 159 and 160, 161 and 162, 163, moving such clamps into work gripping position. Machining head spindles 148, 149 are in retracted position at this stage, engaging limit switches LS7 and LS8, and the saw head 101 is back engaging limit switch LS1 so the machine clamps would likewise normally be held open but for the action of the control circuit just described.

As we saw before, when saw vise jaw 154 clamps the stock, the pressure built up in cylinder 157 will operate pressure switch PS1, causing the saw head 101 to feed forward. Thus, there is no danger of the saw advancing until the stock has been firmly clamped.

Since fluid pressure is actively energizing all the machine clamp cylinders to grip the work, pressure switch PS3 is operated which energizes relays R15 and R17, and consequently solenoid operated valves S15 and S17, admitting fluid pressure to the piston ends of machine cylinders 169 and 170 to advance spindles 148 and 149 and the tools carried thereby into the work at the second station (when the machine has been operated through the stages necessary to bring work to such station). When such spindles reach their predetermined forward limits, limit switches LS9 and LS10 are operated thereby to reverse solenoid operated four-way valves S16 and S18 and return the spindles at rapid traverse to their initial retracted positions.

When such spindles thus return, limit switches LS7 and LS8 are operated. Since relay R8 has been closed and the saw has completed its cut, the machine clamps 127, 128 and 140, 141, and 143, 144, will open and, when fully opened, pressure switch PS4 will be actuated. Limit switch LS5 is still closed, normally open relay contact R5 is closed, and closing of pressure switch PS4 completes a circuit through relay R7. Solenoid operated four-way valve S7 is consequently operated to cause reciprocation of rack 137 to index trunnion 133 to bring clamps 129', 130' back to station 2, this time carrying a cut-off work-piece therewith. Limit switch LS4 is operated by cam 165 on such trunnion and, since relays R5 and R8 are still held, the circuit through relay R9 will be broken, causing clamps 129, 130 (now back at station 1) to be opened, ready to receive another work-piece.

It will thus be seen that the cycle has been completed, and may thereafter be repeated until there is no longer sufficient stock remaining to provide one more work-piece or cut-off section of proper length. As shown in Fig. 8, a limit switch 176 may be adjustably positioned along a bar parallel to track 104 at a distance from the forward end of such track corresponding to the length of the section which is to be severed from the stock to form the individual work-piece, as determined by the gauge means. To allow a margin of error, such switch will preferably be positioned slightly further than this distance from the end of the track. Such switch may be included in the electrical control system of solenoid operated valve S13, S14, for example, together with time-delay means, so that when thus engaged the current feeding advance of the mechanism is not interrupted but the circuit is later broken to prevent now feeding a too short length of stock which would only interfere with manual operation of the transfer and machining mechanism to clear the machine.

An alternative cropping stop 171 (see Fig. 3) may be provided adapted to be interposed for engagement by the end of stock 152 and retracted by fluid pressure operated piston-cylinder assembly 172, either manually controlled or adapted to be automatically permanently retracted when the saw carriage advances to make the first cut. A somewhat shorter crop may thus be taken, but normally the employment of machine clamp jaws 127, 128, in closed position as a cropping stop is entirely satisfactory as above described.

Figure 4:
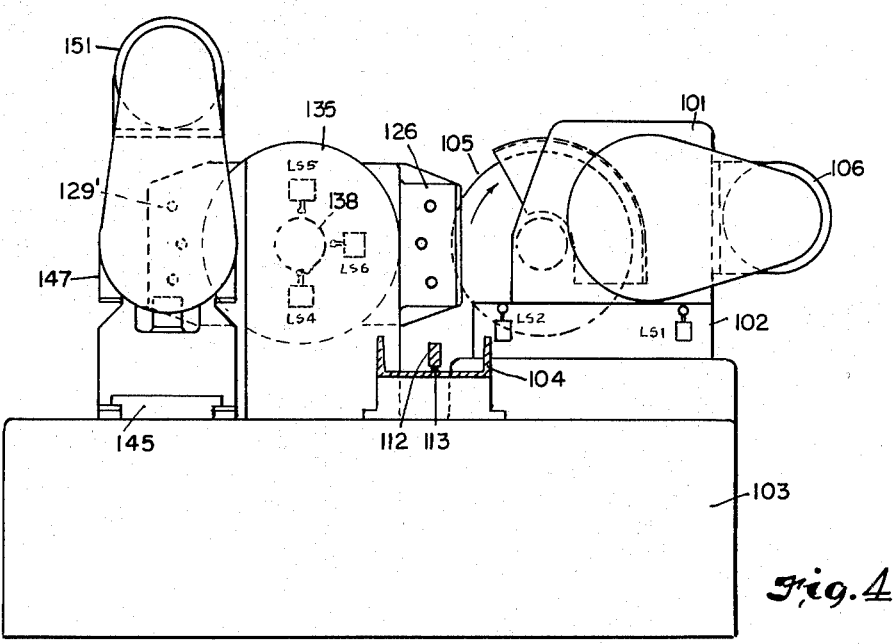
Fig. 4 is an end elevational view of the machine of Fig. 3.
Figures 6, 7:
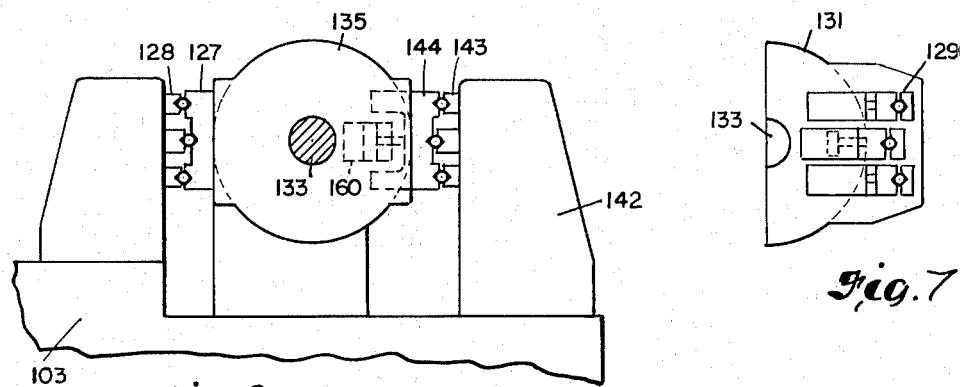
Fig. 6 is a vertical sectional view taken along the line 6—6 on Fig. 3.
Fig. 7 is a fragmentary end elevational view of the transfer mechanism.
Figure 9:
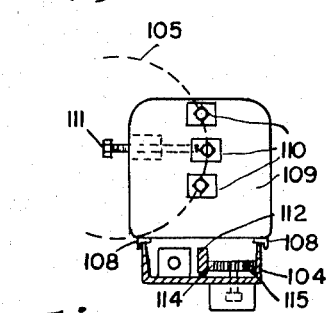
Fig. 9 is a vertical sectional view taken on the line 9—9 on Fig. 8.

When a plurality of lengths of stock are to be simultaneously handled by the machine (the various clamping jaws are illustrated to accommodate three) a corresponding number of machining heads will be provided, operating in unison thereon. I arrange the pairs of jaws of each such clamping means on an arc corresponding to the peripheral arc of the saw blade employed as shown in Figs. 4 and 9, for example. As a result, the saw not only severs each length of stock simultaneously, thereby saving time, but also the advance of the saw is smooth and uniform without any tendency to jump as may be the case when different pieces of stock are operated upon more or less sequentially. While it has been common practice to sever a bundle of different lengths of stock by a single traverse of a cold metal cutting saw, it is, of course, obvious that no such method is practicable where, as here, a succession of operations is to be performed in the same machine.

Jaws 127, 128 of the machine clamp at the first station are operative to grip the stock closely adjacent the saw blade during the sawing operation while jaws 153, 154 of the saw vise grip the same to the other side of the saw. The stock is accordingly very firmly held and an accurate cut is obtained. Transfer clamps 129, 129', may be spaced as desired from the saw to permit a sufficient portion of the cut-off section to protrude therefrom for the performance of operations thereon at the second work station. Such latter operations may include chamfering, center-drilling, threading and tapping, and the like.

Rotary saws of the type employed in automatic cold metal sawing machines are quite steady and accurate but I have found it desirable to provide some means to ensure that any wobble is eliminated at the point where the saw engages the stock so that the cut will always be initiated at exactly the required location. Once the cut actually commences, the saw will follow through very accurately. I accordingly mount a pair of opposed brass guide shoes 173, 174, to either side of saw blade 105 (see Fig. 3) on adjusting screws threaded in saw guard 175. Such shoes are positioned to engage the blade near the point of engagement with the stock. They will also preferably be positioned near the outer periphery of the saw blade.

The clamping means on the rotating transfer trunnion are spaced from the saw sufficiently that the ends of the cut-off sections may protrude therefrom sufficiently for the performance of later operations thereon at the second work station. This also allows room for an intervening machine clamp adjacent the saw on the transfer side which cooperates with the vise or clamp on the feed side to hold the stock firmly while the saw blade is traversed therebetween to make the cut. The work-piece is firmly gripped at all times until finally ejected from the machine so that proper registry may be maintained and the machine therefore function automatically without supervision. Transfer drum elements 131 and 132 may be adjustably mounted on trunnion 133 to accommodate different lengths of cut-off work-pieces, and the mounts for the machine tools at the second work station are, of course, similarly adjustable.

When a new length of stock is fed to the machine, it is prevented from being fed the full normal feed distance by the interposition of the auxiliary cropping stop or by preliminary closing of the jaws of the machine clamp on the transfer side of the saw blade. In either case such temporary stop means is automatically withdrawn after the stock has been clamped for performance of the initial sawing operation thereon and preferably before such operation is completed. A short cropping cut is made and the machine is then ready for continued automatic cycling.

It will be apparent from the foregoing that I have provided an automatic machine capable of turning out a large number of identical parts from a length of stock such as bar stock or tubing fed thereto at a relatively rapid rate. The cut-off and machining operations take place simultaneously and the transfer means involves no lost motion but both sets of clamps thereon are always occupied with work-pieces once the machine has completed its first full cycle.

It will be noted (Figs. 4–7) that the machine clamp jaws are mounted for relative reciprocation toward and away from each other on a line normal to the axis of the stock and generally radial of the axis of rotation of the transfer drum. Consequently, when such jaws are opened, the stock will clear the jaws as the drum turns. In the case of jaws 127, 128 adjacent the saw, such jaws are relatively reciprocable on a line parallel to the plane of travel of the axis of the saw blade and normal to the axis of the stock.

Since two separate clamping means are provided closely adjacent either side of the saw blade adapted very firmly to clamp the stock during performance of the sawing operation therebetween, it is only necessary to provide relatively weak work-piece gripping means on the transfer drum merely applying sufficient pressure to preserve register of the cut-off piece after release thereof by jaws 127, 128.

Other modes of applying the principle of the invention may be employed, change being made as regards the details described, provided the features stated in any of the following claims or the equivalent of such be employed.

I therefore particularly point out and distinctly claim as my invention:

1. In an automatic cold metal sawing machine including a rotary saw, means operative to reciprocate said saw to cut off sections from a length of stock advanced therepast, and stock feeding means operative intermittently to advance such length of stock into position to be cut off by said saw; stock clamping means closely adjacent the side of said saw remote from such feeding means normally operative firmly to clamp such stock during performance of a sawing operation, control means for holding said stock clamping means closed during initial feeding of a new length of stock to the machine to serve as a stop preventing passage of such stock the full normal feed distance so that the first cut by the saw will be a short cropping cut, and control means for automatically opening said clamping means prior to completion of such initial cut to prevent jamming of the short cut-off section and permit fully automatic cycling of the machine thereafter.

2. In an automatic cold metal sawing machine including a rotary saw, means operative to reciprocate said saw to cut off sections from a length of stock advanced therepast, and stock feeding means operative intermittently to advance such length of stock into position to be cut off by said saw; stock clamping means adjacent the feed side of said saw for clamping such stock during the sawing operation, stop means adjacent the other side of said saw temporarily interposed into the path of such stock during initial feeding of a new length of stock to the machine to prevent passage of such stock the full normal feed distance so that the first cut by said saw will be a short cropping cut, and time control means for automatically retracting said stop means for clamping of such stock by said clamping means and prior to completion of such initial cut to prevent jamming of the short cut-off section and permit fully automatic cycling of the machine thereafter.

3. In an automatic cold metal sawing machine including a rotary saw, means operative to reciprocate said saw to cut off sections from lengths of stock advanced therepast, and stock feeding means operative intermittently to advance such lengths of stock into position to be cut off by said saw; stock clamping means adjacent said saw for firmly holding such stock during such cut-off operation, and stock clamping means on said stock feeding means for holding such stock during feeding thereof, both such clamping means including stock holding jaws arranged and disposed to hold a plurality of parallel lengths of stock on an arc substantially that of the outer peripheral arc of said saw and having its center on the line of reciprocation of the axis of said saw, the stock clamping means holding all such lengths of stock entirely within the path of the saw blade as thus reciprocated for simultaneous cutting off thereby.

4. In a sawing machine having a rotary saw, means for presenting a plurality of parallel lengths of stock simultaneously to such saw for severing thereby, including means for holding such lengths of stock arranged on an arc substantially that of the outer peripheral arc of such saw and entirely within the path of the saw blade for simultaneous engagement and severing.

5. In an automatic cold metal sawing machine including a rotary saw, means operative to reciprocate said saw to cut off sections from lengths of stock advanced therepast, and stock feeding means operative intermittently to advance such lengths of stock into position to be cut off by said saw; stock clamping means adjacent said saw to either side thereof for firmly holding such stock during the cut-off operation, said clamping means comprising opposed jaws relatively reciprocable toward and away from each other on a line normal to the axis of such stock and parallel to the plane of travel of the saw blade axis, and stock clamping means on said stock feeding means for holding such stock during feeding thereof, all such stock clamping means including stock holding jaws arranged and disposed to hold a plurality of parallel lengths of stock on an arc substantially that of the outer peripheral arc of said saw and having its center on the line of reciprocation of the axis of said saw, the lengths of stock being held entirely within the path of the saw blade as thus reciprocated for simultaneous cutting off thereby.

References Cited in the file of this patent

UNITED STATES PATENTS

| | | |
|---|---|---|
| 666,905 | Packer | Jan. 29, 1901 |
| 1,064,336 | Joyce | June 10, 1913 |
| 1,195,731 | Rhodes | Aug. 22, 1916 |
| 1,198,797 | Waterman | Sept. 19, 1916 |
| 1,219,935 | Gorton | Mar. 20, 1917 |
| 1,710,286 | Agee | Apr. 23, 1929 |
| 1,840,731 | Matthews | Jan. 12, 1932 |
| 2,025,268 | Bullard | Dec. 4, 1935 |
| 2,376,335 | Braendel | May 22, 1945 |
| 2,376,654 | Braendel | May 22, 1945 |
| 2,397,974 | Morrow | Apr. 9, 1946 |
| 2,639,491 | Rose | May 26, 1953 |